United States Patent
Han et al.

(10) Patent No.: US 10,097,895 B2
(45) Date of Patent: Oct. 9, 2018

(54) CONTENT PROVIDING APPARATUS, SYSTEM, AND METHOD FOR RECOMMENDING CONTENTS

(71) Applicant: SAMSUNG ELECTRONICS CO., LTD., Suwon-si (KR)

(72) Inventors: Young-seok Han, Seoul (KR); Won-seok Ahn, Yongin-si (KR); Hyung-keuk Lee, Seoul (KR); Jae-hyeok Choi, Seoul (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 94 days.

(21) Appl. No.: 14/269,636

(22) Filed: May 5, 2014

(65) Prior Publication Data
US 2015/0106847 A1 Apr. 16, 2015

(30) Foreign Application Priority Data
Oct. 11, 2013 (KR) ........................ 10-2013-0121429

(51) Int. Cl.
*H04N 21/482* (2011.01)
*H04N 21/2668* (2011.01)
(Continued)

(52) U.S. Cl.
CPC ..... *H04N 21/4826* (2013.01); *H04N 21/2668* (2013.01); *H04N 21/44204* (2013.01); *H04N 21/45* (2013.01); *H04N 21/482* (2013.01)

(58) Field of Classification Search
CPC ......... H04N 21/4126; H04N 21/25875; H04N 21/274; H04N 21/41407; H04N 21/4223;
(Continued)

(56) References Cited

U.S. PATENT DOCUMENTS

| 5,953,005 A | * | 9/1999 | Liu | ................... | G06F 17/30017 434/307 A |
| 7,095,402 B2 | * | 8/2006 | Kunii | .................... | G06F 1/1626 345/169 |

(Continued)

FOREIGN PATENT DOCUMENTS

| JP | 2012-222586 A | 11/2012 |
| KR | 10-2010-0069395 A | 6/2010 |

(Continued)

*Primary Examiner* — Ricky Chin
*Assistant Examiner* — Jen-Shi Huang
(74) *Attorney, Agent, or Firm* — Sughrue Mion, PLLC (57) ABSTRACT

A content providing apparatus, system, and method for recommending content. The method includes: receiving user information from a display apparatus; determining whether a terminal apparatus of a user is registered, based on the received user information; when the terminal apparatus is determined to be registered, determining whether recommended content for the user exists, based on pattern information about content usage of the user and content information; and when the recommended content for the user is determined to exist, transmitting a notification message for the recommended content to the terminal apparatus. Therefore, utilization of a notification service for recommended content is further improved.

23 Claims, 4 Drawing Sheets

(51) Int. Cl.
*H04N 21/442* (2011.01)
*H04N 21/45* (2011.01)

(58) Field of Classification Search
CPC ......... H04N 21/4334; H04N 21/47214; H04N 21/4826; H04N 21/6582; H04N 21/2668; H04N 21/44204; H04N 21/45; H04N 21/482; G06F 21/305; G11B 20/00869
See application file for complete search history.

(56) References Cited

U.S. PATENT DOCUMENTS

| | | | | |
|---|---|---|---|---|
| 7,206,497 | B1* | 4/2007 | Boyle | H04N 5/44543 348/E5.007 |
| 7,748,017 | B2* | 6/2010 | Kiiskinen | H04N 5/44543 715/867 |
| 2002/0056118 | A1* | 5/2002 | Hunter | G06Q 20/123 725/87 |
| 2005/0201720 | A1* | 9/2005 | Toyoshima | G11B 27/00 386/234 |
| 2006/0040638 | A1* | 2/2006 | McQuaide, Jr. | H04L 12/2812 455/403 |
| 2006/0041910 | A1* | 2/2006 | Hatanaka | H04N 5/765 725/58 |
| 2006/0212906 | A1* | 9/2006 | Cantalini | H04N 5/44543 725/62 |
| 2007/0126854 | A1* | 6/2007 | Moreau | H04N 7/17318 348/14.01 |
| 2008/0022323 | A1* | 1/2008 | Koo | G08C 17/02 725/81 |
| 2008/0115164 | A1* | 5/2008 | Kiiskinen | H04N 5/44543 725/39 |
| 2008/0134267 | A1* | 6/2008 | Moghe | H04L 29/06027 725/112 |
| 2008/0152316 | A1* | 6/2008 | Sylvain | G11B 27/034 386/240 |
| 2009/0270085 | A1* | 10/2009 | Jones | H04M 11/08 455/420 |
| 2010/0241699 | A1* | 9/2010 | Muthukumarasamy | G06F 17/30035 709/203 |
| 2011/0138064 | A1* | 6/2011 | Rieger | G06F 17/30905 709/228 |
| 2011/0298596 | A1* | 12/2011 | Warrick | 340/12.53 |
| 2011/0316671 | A1* | 12/2011 | Yaguchi et al. | 340/5.83 |
| 2013/0147623 | A1* | 6/2013 | Somasundaram | G08B 21/00 340/540 |
| 2014/0373082 | A1* | 12/2014 | Miyazaki | G06F 17/30023 725/110 |

FOREIGN PATENT DOCUMENTS

| | | |
|---|---|---|
| KR | 10-2010-0069474 A | 6/2010 |
| KR | 10-2011-0117748 A | 10/2011 |
| KR | 10-2012-0042314 A | 5/2012 |
| KR | 10-2012-0075515 A | 7/2012 |
| KR | 10-2013-0005169 A | 1/2013 |
| KR | 10-2013-0041725 A | 4/2013 |

* cited by examiner

CONTENT PROVIDING APPARATUS, SYSTEM, AND METHOD FOR RECOMMENDING CONTENTS

CROSS-REFERENCE TO RELATED APPLICATION

This application claims priority under 35 U.S.C. § 119 from Korean Patent Application No. 10-2013-0121429, filed on Oct. 11, 2013, in the Korean Intellectual Property Office, the disclosure of which is incorporated herein by reference in its entirety.

BACKGROUND

1. Field

The present general inventive concept generally relates to providing a content providing apparatus, system, and method for recommending content, and more particularly, to providing a content providing apparatus, system, and method for recommending content to a terminal apparatus.

2. Description of the Related Art

In general, a content providing apparatus recommends content appropriate for a user to be displayed on a display apparatus. In detail, the content providing apparatus determines the content appropriate for the user based on pattern information of the user that is pre-registered and provides the display apparatus with a notification service for a preset recommended content.

For example, the content providing apparatus combines content mainly used by the user, a time of usage, a channel on which the content is provided, etc. to generate and update pattern information for recommending content that is the most appropriate for the user. Also, the content providing apparatus determines recommended content of the user based on the updated pattern information and provides the display apparatus with a notification service for a preset recommended content. Therefore, the display apparatus informs the user that there is recommended content appropriate for the user, based on the notification service provided from the content providing apparatus, and the user may use the recommended content according to the information.

However, the content providing apparatus for recommending content provides the display apparatus with a notification service for a recommended content of the user. Therefore, if the user is not positioned in a place where the display apparatus is installed (for example, in a home of the user), the content providing apparatus does not provide the notification service for the recommended content.

In general, the content providing apparatus determines whether there is recommended content currently appropriate for the user, based on pattern information of the user and content information that is electronic program guide (EPG) information. If there is the recommended content currently appropriate for the user, the content providing apparatus provides the display apparatus with a notification service for the recommended content.

Therefore, if the user is not positioned in the home where the display apparatus is installed, as described above, the user is not provided with a recommended content notification service for a content that is mainly used by the user.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a content providing apparatus, system, and method which may improve utilization of a notification service for recommended content.

According to an aspect of the exemplary embodiments, there is provided a method of recommending content. The method may include: receiving user information from a display apparatus; determining whether a terminal apparatus of a user is registered, based on the received user information; determining whether recommended content for the user exists when the terminal is determined to be registered; and transmitting, to the terminal apparatus, a notification message about the recommended content when the recommended content is determined to exist. The recommended content is determined based on pattern information about content usage of the user and content information.

The method may further include: when the terminal apparatus is not registered, transmitting, to the display apparatus, a notification message for notifying the display apparatus that the terminal apparatus is not registered; and registering the terminal apparatus when a request to register the terminal apparatus is received from the display apparatus.

The pattern information may be at least one of a genre, usage time, and a channel for providing content that is used by the user.

The transmitting of the notification message may include: when the recommended content is a broadcast program, determining whether the display apparatus and the terminal apparatus are present in a network, and when the display apparatus and the terminal apparatus are determined to be present in the network, transmitting, to the terminal apparatus, an execution-related notification message for the recommended content; and when the display apparatus and the terminal apparatus are determined not to be present in the network, transmitting, to the terminal apparatus, a recording-related notification message for the recommended content.

When the display apparatus and the terminal apparatus are determined to be present in the network after transmitting the recording-related notification message, the execution-related notification message for the recommended content may be transmitted to the terminal apparatus.

When the recommended content is an application, an installing or update-related notification message for the application may be transmitted to the terminal apparatus.

The content providing apparatus may update the pattern information based on content that is provided to the display apparatus.

The user information may be at least one of face recognition information and voice recognition information of the user.

According to another aspect of the exemplary embodiments, there is provided a content providing apparatus including: a communicator configured to communicate with a display apparatus; a determiner configured to determine whether a terminal apparatus of a user is registered based on user information received from the display apparatus; and a controller configured to determine whether recommended content for the user exists when the determiner determines that the terminal apparatus is registered, wherein the controller determines the recommended content based on pattern information about content usage of the user and content information and, the controller is further configured to generate a notification message about the recommended content and to control transmission of the notification message to the terminal apparatus, when controller determines that the recommended content exists.

When the terminal apparatus is not registered, the controller may transmit another notification message, to the display apparatus, for notifying the display apparatus that the terminal apparatus of the user is not registered, and when a request for registering the terminal apparatus of the user is received from the display apparatus, the controller may register the terminal apparatus according to the request.

The pattern information may be at least one of a genre, usage time, and a channel providing content that is used by the user.

When the recommended content is a broadcast program, the controller may determine whether the display apparatus and the terminal apparatus are present in a network, and when the controller determines that the display apparatus and the terminal apparatus are present in the network, the controller may transmit, to the terminal apparatus, an execution-related notification message for the recommended content, and when the controller determines that the display apparatus and the terminal apparatus are not present in the network, the controller may transmit, to the terminal apparatus, a recording-related notification message for the recommended content.

When controller determines that the display apparatus and the terminal apparatus are present in the network after transmitting the recording-related notification message, the controller may transmit, to the terminal apparatus, the execution-related notification message for the recommended content.

When the recommended content is an application, the controller may transmit, to the terminal apparatus, an installing or update-related notification message for the application.

The content providing apparatus may further include a storage. The controller may update the pattern information about the content usage of the user based on content that is provided to the display apparatus and store the updated pattern information in the storage.

According to another aspect of the exemplary embodiments, there is provided a system for recommending content. The system may include: a display apparatus configured to recognize a face or a voice of a user; and a content providing apparatus configured to transmit, to a terminal apparatus, a notification message of a recommended content appropriate for the user based on pattern information of content usage of the user and content information and based on whether the terminal apparatus is registered which is determined based on user information about the face or the voice of the user received from the display apparatus. The display apparatus may execute or record the recommended content according to a control command of the terminal apparatus.

When the terminal apparatus of the user is not registered, the content providing apparatus may transmit, to the display apparatus, a notification message for notifying the display apparatus that the terminal apparatus of the user is not registered, and when a request for registering the terminal apparatus of the user is received from the display apparatus, the content providing apparatus may register the terminal apparatus according to the request.

When the recommended content is a broadcast program, the content providing apparatus may determine whether the display apparatus and the terminal apparatus are present in a network, when the content providing apparatus determines that the display apparatus and the terminal apparatus are present in the network, the content providing apparatus may transmit an execution-related notification message for the recommended content to the terminal apparatus, and when the content providing apparatus determines that the display apparatus and the terminal apparatus are not present in the network, the content providing apparatus may transmit a recording-related notification message for the recommended content to the terminal apparatus.

When the content providing apparatus determines that the display apparatus and the terminal apparatus are present in the network after transmitting the recording-related notification message, the content providing apparatus may transmit, to the terminal apparatus, the execution-related notification message for the recommended content.

When the recommended content is an application, the content providing apparatus may transmit, to the terminal apparatus, an installing or update-related notification message for the application.

BRIEF DESCRIPTION OF THE DRAWINGS

The above and/or other aspects will be more apparent by describing certain exemplary embodiments with reference to the accompanying drawings, in which.

DETAILED DESCRIPTION OF THE
EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
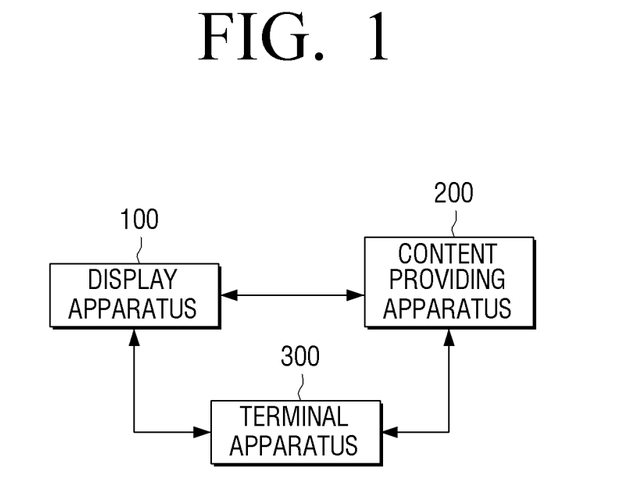
FIG. 1 is a block diagram illustrating a system for recommending content according to an exemplary embodiment.

FIG. 1 is a block diagram illustrating a system for recommending content according to an exemplary embodiment.

Referring to FIG. 1, the system includes a display apparatus 100, a content providing apparatus 200, and a terminal apparatus 300.

The display apparatus 100 is a terminal apparatus such as a smart TV, receives various types of contents such as a broadcast image, an application, etc. from the content providing apparatus 200, and displays the various types of contents. In particular, the display apparatus 100 recognizes a face or a voice of a user according to an occurrence of a particular event, generates user information according to the recognized face or voice of the user, and transmits the user information to the content providing apparatus 200. Here, the particular event may occur so as to turn on the display apparatus 100. Therefore, if the particular event for turning on the display apparatus 100 occurs, the display apparatus 100 may recognize the face of the user through a camera or recognize the voice of the user through a microphone, generate the user information according to the recognized face or voice, and transmit the user information to the content providing apparatus 200.

The content providing apparatus 200 is a terminal apparatus that provides the display apparatus 100 with content requested by the user. In particular, the content providing apparatus 200 analyzes content usage pattern of a preregistered user and provides a notification service for recommended content that is appropriate or may be preferred by the preregistered user based on analyzed usage pattern information and content information. Here, the content providing apparatus 200 may determine whether the terminal apparatus 300 of the preregistered user is registered to transmit a notification message of a recommended content to the terminal apparatus 300 of the preregistered user.

The terminal apparatus 300 is a terminal apparatus that performs wireless communication like a smartphone, a tablet personal computer (PC), or the like. In an exemplary embodiment, the terminal apparatus 300 is a sub terminal apparatus with respect to the main apparatus such as the display apparatus 100. The terminal apparatus 300 may be a terminal apparatus that is registered in the content providing apparatus 200. Therefore, the terminal apparatus 300 that is registered in the content providing apparatus 200 may receive a notification message of a recommended content appropriate for the user from the content providing apparatus 200. If a user command is input in relation to the received notification message, the terminal apparatus 300 may control an operation of the display apparatus 100 based on the input user command.

According to exemplary embodiments, the terminal apparatus 300 that receives the notification message of the recommended content from the content providing apparatus 200 may transmit a control command for executing or recording the corresponding content to the display apparatus 100. Therefore, the display apparatus 100 may execute or record the recommended content based on the control command received from the terminal apparatus 300.

According to exemplary embodiments, if user information that is generated according to a recognition of a face or a voice of a first user is received from the display apparatus 100, the content providing apparatus 200 determines whether the terminal apparatus 300 of the first user is registered. If it is determined that the terminal apparatus 300 of the first user is not registered, the content providing apparatus 200 generates a notification message for notifying the display apparatus 100 that the terminal apparatus 300 of the first user is not registered and transmits the notification message to the display apparatus 100. If a request for registering the terminal apparatus 300 of the first user is received from the display apparatus 100, the content providing apparatus 200 registers the terminal apparatus 300 of the first user according to the request.

If the terminal apparatus 300 of the first user is registered, the content providing apparatus 200 determines whether there is a recommended content appropriate for the first user, based on pattern information and content information that are generated according to usage of a content of the first user.

Here, the pattern information that is generated according to the usage of the content of the first user may be information that is generated based on at least one of a genre, usage time, and a channel on which the content is provided.

According to an exemplary embodiment, if the recommended content is a broadcast program, the content providing apparatus 200 determines whether the display apparatus 100 and the terminal apparatus 300 exist in the same network. If it is determined that the display apparatus 100 and the terminal apparatus 300 exist in the same network, the content providing apparatus 200 transmits an execution-related notification message of the recommended content to the terminal apparatus 300.

If the execution-related notification message is received, the terminal apparatus 300 transmits a control command related to an execution of the recommended content to the display apparatus 100 according to a user command of the first user. Therefore, the display apparatus 100 may change a channel corresponding to a currently played content into a channel corresponding to a recommended content to play the recommended content.

If it is determined that the display apparatus 100 and the terminal apparatus 300 do not exist in the same network, the content providing apparatus 200 transmits a recording-related notification message of the recommended content to the terminal apparatus 300. If the recording-related notification message is received, the terminal apparatus 300 transmits a control command related to recording of the recommended content to the display apparatus 100 according to a user command of the first user. Therefore, the display apparatus 100 may continuously output the currently played content based on the received control command to record and store the recommended content.

The content providing apparatus 200 periodically performs data communication with the terminal apparatus 300 or the display apparatus 100 that transmits the recording-related notification message of the recommended content, to collect network information of the terminal apparatus 300. If it is determined that the terminal apparatus 300 and the display apparatus 100 exist in the same network, based on the collected network information, the content providing apparatus 200 may transmit the execution-related notification message of the recommended content to the terminal apparatus 300. If the execution-related notification message is received, the terminal apparatus 300 transmits a control command related to playing of the recommended content to the display apparatus 100 according to a user command of the first user. Therefore, the display apparatus 100 may stop recording and storing the recommended content based on the received control command and change the channel corresponding to the currently played content to the channel which provides the recommended content in order to play the recommended content.

However, the present general inventive concept is not limited thereto, and if the terminal apparatus 300 and the display apparatus 100 exist in the same network, the content providing apparatus 200 may transmit the execution or recording-related notification message of the recommended content. In detail, if the display apparatus 100 that exists in the same network with the terminal apparatus 300 uses another content, the content providing apparatus 200 may transmit the execution or recording-related notification message of the recommended content to the terminal apparatus 300.

If the execution or recording-related notification message is received, the terminal apparatus 300 transmits a control command related to the execution or recording of the recommended content to the display apparatus 100 according to a user command of the first user. Therefore, the display apparatus 100 changes a channel to view the recommended content or record and store the recommended content based on the received control command.

According to another exemplary embodiment, if the recommended content is an application, the content providing apparatus 200 transmits an installing or update-related notification message of the corresponding application to the terminal apparatus 300. If the installing or update-related notification message is received, the terminal apparatus 300 transmits a control command related to an execution of the application to the display apparatus 100 according to a user command of the first user. Therefore, the display apparatus 100 may receive execution information about the corresponding application from the content providing apparatus 200 to install or update the corresponding application.

An operation of the system according to the present general inventive concept has been described in brief. Elements of the content providing apparatus 200 and a method of recommending content will now be described in detail.

Figure 2:
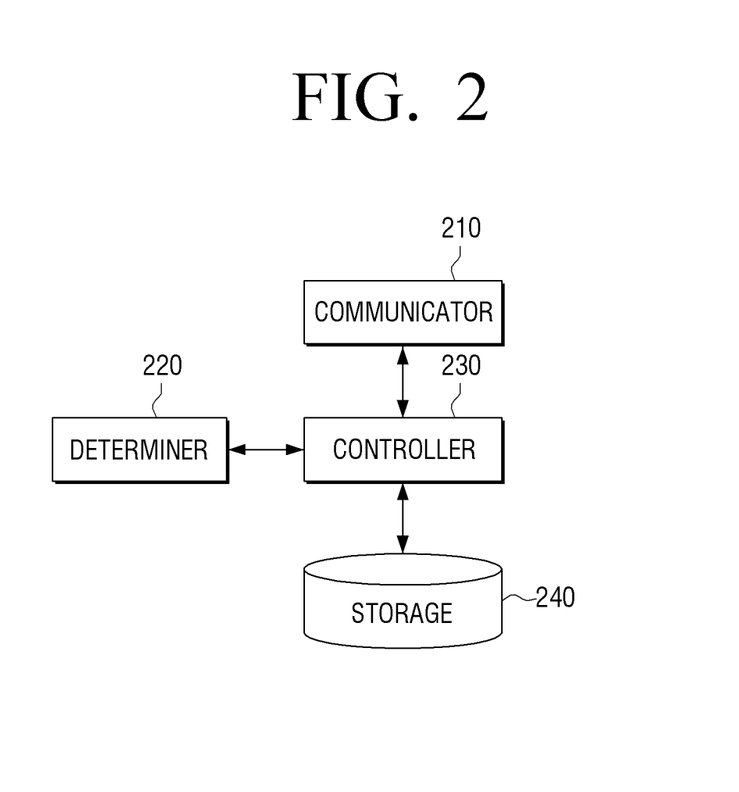
FIG. 2 is a block diagram illustrating a content providing apparatus according to an exemplary embodiment.

FIG. 2 is a block diagram illustrating a content providing apparatus according to an exemplary embodiment.

Referring to FIG. 2, the content providing apparatus 200 includes a communicator 210, a determiner 220, a controller 230, and storage 240.

The communicator 210 communicates with at least one of the display apparatus 100 and the terminal apparatus 300 that is preregistered in the content providing apparatus 200. In detail, the communicator 210 may wirelessly communicate with the display apparatus 100 or the terminal apparatus 300 according to various types of wireless communication standards such as WiFi, 3rd Generation (3G), 3rd Generation Partnership Project (3GPP), Long Term Evolution (LTE), etc. The communicator 210 may also communicate with the display apparatus 100 according to a wired communication standard to provide a broadcast program-related content or an application-related content.

If user information of a user is received from the display apparatus 100, the determiner 220 determines whether information or identification of the terminal apparatus 300 of the user is stored in the storage 240 based on the received user information. Here, the user information may be information related to recognition of a face or a voice of the user according to an occurrence of a particular event.

According to exemplary embodiments, if an event for turning on the display apparatus 100 occurs, the display apparatus 100 may recognize the face of the user through a camera or recognize the voice of the user through a microphone, generate user information according to the recognition of the face or voice of the user, and transmit the user information to the content providing apparatus 200. Here, if a plurality of users are positioned next to the display apparatus 100 within a preset range, the display apparatus 100 may recognize faces or voices of the plurality of users, generate user information for each of the plurality of users according to the recognition of the faces or voices of the plurality of users, and transmit the user information to the content providing apparatus 200.

If user information generated according to recognition of faces or voices of one or more users is received, the determiner 220 determines whether the corresponding user is certified and the terminal apparatus 300 is registered, based on the received user information. In detail, the storage 240 may store registration information including certification information about a face or voice pattern of a registered user and terminal information about the terminal apparatus 300.

Therefore, the determiner 220 may certify the user according to whether the storage 240 stores registration information related to face or voice pattern information included in the received user information of pre-stored registration information. The determiner 220 may also determine whether the terminal apparatus 300 of the user is registered according to whether terminal information about the terminal apparatus 300 is stored in the corresponding registration information.

The controller 230 controls overall operations of elements of the content providing apparatus 200. In particular, the controller 230 controls the communicator 210 to transmit a notification message of recommended content to the terminal apparatus 300. In detail, if the terminal apparatus 300 is not registered, the controller 230 transmits, to the display apparatus 100, a notification message for notifying the display apparatus 100 that the terminal apparatus 300 of the user is not registered. If a request for registering the terminal apparatus 300 of the user is received from the display apparatus 100, the controller 230 may register the terminal apparatus 300 according to the request.

If the terminal apparatus 300 of the user is registered, the controller 230 determines whether there is recommended content appropriate for the user based on pattern information and content information about user content usage that are pre-stored. If it is determined that recommended content appropriate for the user exists, the controller 230 generates a notification message of the recommended content and transmits the notification message to the terminal apparatus 300 of the user.

Here, the pattern information may be at least one of a genre, usage time, and a channel on which the content used by the user is provided. The pattern information may also be compared and matched with registration information of a plurality of users pre-stored in the storage 240 and then the pattern information may be stored. In detail, if content is provided to the display apparatus 100 after the user is certified, the controller 230 may analyze at least one of a genre, usage time, and a channel on which the corresponding content is provided to update pattern information of the certified user. Therefore, the storage 240 may match the registration information of the certified user with the updated pattern information and then store the matched registration information and the updated pattern information.

Therefore, the controller 230 determines whether there is recommended content appropriate for the user, based on the pattern information matching the registration information of the corresponding user and based on content information that is EPG information. If it is determined that there is the recommended content appropriate for the user, the controller 230 may transmit a notification message of the recommended content to the terminal apparatus 300 of the user based on terminal information included in the registration information of the corresponding user.

According to an exemplary embodiment, if the recommended content is a broadcast program, the controller 230 transmits an execution-related notification message or a recording-related notification message to the terminal apparatus 300 according to whether the display apparatus 100 and the terminal apparatus 300 exist in the same network.

In detail, the communicator 210 may periodically receive address information from the display apparatus 100 and the terminal apparatus 300. Therefore, the controller 230 may determine whether the display apparatus 100 and the terminal apparatus 300 exist in the same network, based on the address information received from the display apparatus 100 and the terminal apparatus 300. However, the present general inventive concept is not limited thereto, and the controller 230 may compare preregistered position information of the display apparatus 100 with position information of the terminal apparatus 300 received through the communicator 210 to determine whether the terminal apparatus 300 is positioned within a preset range.

If it is determined that the terminal apparatus 300 and the display apparatus 100 exist in the same network or are within a preset range, the controller 230 transmits an execution-related notification message of the recommended content to the terminal apparatus 300. Therefore, the terminal apparatus 300 that receives the execution-related notification message for the recommended content, transmits an execution command for the recommended content to the display apparatus 100 according to a user command. Therefore, the display apparatus 100 may change a channel to a channel providing the recommended content based on the execution command received from the terminal apparatus 300 to display the recommended content.

If it is determined that the terminal apparatus 300 and the display apparatus 100 do not exist in the same network or within the preset range, the controller 230 may provide a recording-related notification message of the recommended content to the terminal apparatus 300. Therefore, the terminal apparatus 300 that receives the recording-related notification message about the recommended content transmits a recording command for the recommended content to the display apparatus 100 according to a user command. As a result, the display apparatus 100 may record the recommended content based on the recording command received from the terminal apparatus 300.

Although the user is in a position where the user may not view the recommended content, as described above in an exemplary embodiment, the display apparatus 100 may record the recommended content of the user. Therefore, the user may use a service for the recommended content through the display apparatus 100.

After the controller 230 transmits the recording-related notification message to the terminal apparatus 300, the controller 230 periodically receives address information of the terminal apparatus 300 from the terminal apparatus 300 or the display apparatus 100 to determine whether the terminal apparatus 300 and the display apparatus 100 exist in the same network. If it is determined that the terminal apparatus 300 and the display apparatus 100 exist in the same network, the controller 230 transmits an execution-related notification message of the recommended content to the terminal apparatus 300.

Therefore, the terminal apparatus 300 that receives the execution-related notification message about the recommended content transmits an execution command for the recommended content to the display apparatus 100 according to a user command. As a result, the display apparatus 100 may stop recording the recommended content, receive the recommended content from a channel providing the recommended content, and display the recommended content. However, the present general inventive concept is not limited thereto, and if the execution command for the recommended content is received, the display apparatus 100 that records the recommended content may simultaneously record and execute the recommended content.

According to another exemplary embodiment, if the recommended content is an application, the controller 230 transmits an installing or update-related notification message for the application to the terminal apparatus 300. Therefore, the terminal apparatus 300 that receives the installing or update-related notification message for the application transmits an installing or updating execution command for the application to the display apparatus 100 according to a user command. As a result, the display apparatus 100 may receive execution information for the application from the content providing apparatus 200 or an external server to install or update the application.

For example, if it is determined, based on pattern information of a certified first user, that the certified first user mainly uses content of "Moohandojeon" (a Korean TV show), the controller 230 determines whether it is possible to currently provide recommended content of "Moohandojeon" based on the pattern information of the certified first user and the content information that is EPG information. If it is determined that it is possible to currently provide the recommended content of "Moohandojeon", the controller 230 determines whether the terminal apparatus 300 of the first user and the display apparatus 100 exist in the same network.

If it is determined that the terminal apparatus 300 of the first user and the display apparatus 100 exist in the same network, the controller 230 determines whether the recommended content of "Moohandojeon" is provided to the display apparatus 100. If it is determined that the recommended content of "Moohandojeon" is provided to the display apparatus 100, the controller 230 may determine that the first user views the recommended content of "Moohandojeon" through the display apparatus 100. If it is determined that the recommended content of "Moohandojeon" is not provided to the display apparatus 100, the controller 230 may determine that the certified first user is not currently viewing the recommended content of "Moohandojeon" through the display apparatus 100.

If it is determined that the first user is not viewing the recommended content of "Moohandojeon", as described above according to an exemplary embodiment, the controller 230 transmits an execution-related notification message about the recommended content of "Moohandojeon" to the terminal apparatus 300 of the first user. Therefore, the first user checks that there is the recommended content of "Moohandojeon" and requests viewing of the recommended content of "Moohandojeon" through the terminal apparatus 300. According to a user command, as described above according to an exemplary embodiment, the terminal apparatus 300 may transmit an execution command for the recommended content of "Moohandojeon" to the display apparatus 100. Also, the display apparatus 100 may receive the recommended content of "Moohandojeon" from a channel providing the recommended content of "Moohandojeon" based on the received execution command and display the recommended content of "Moohandojeon".

If the terminal apparatus 300 and the display apparatus 100 do not exist in the same network, the controller 230 transmits a recording-related notification message for the recommended content of "Moohandojeon" to the terminal apparatus 300 of the first user. Therefore, the first user checks that there is the recommended content of "Moohandojeon" and requests recoding of the recommended content of "Moohandojeon" through the terminal apparatus 300. According to the user command, as described above according to an exemplary embodiment, the terminal apparatus 300 may transmit a recording command for the recommended content of "Moohandojeon" to the display apparatus 100, and the display apparatus 100 may record the recommended content of "Moohandojeon" based on the received recording command.

The elements of the content providing apparatus 200 have been described in detail. A method of recommending content through the terminal apparatus 300 of a user preregistered in the content providing apparatus 200 according to an exemplary embodiment will now be described in detail.

Figure 3:
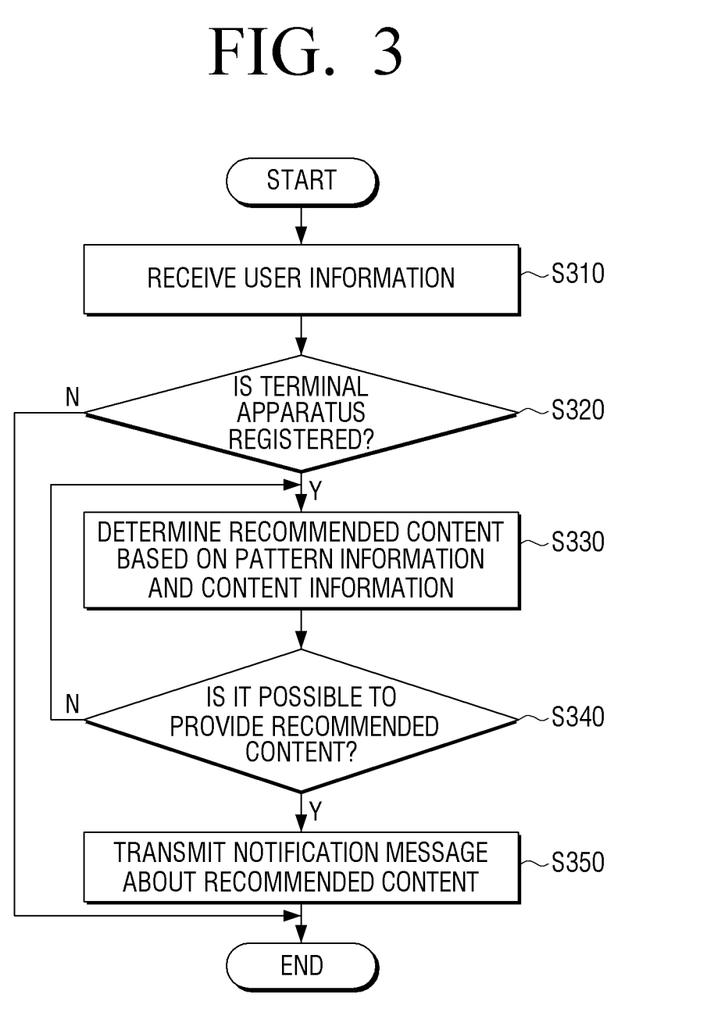
FIG. 3 is a flowchart illustrating a method of recommending content according to an exemplary embodiment.

FIG. 3 is a flowchart illustrating a method of recommending content according to an exemplary embodiment.

Referring to FIG. 3, in operation S310, the content providing apparatus 200 receives user information from the display apparatus 100. According to exemplary embodiments, if an event for turning on the display apparatus 100 occurs, the display apparatus 100 may recognize a face of the user through a camera or recognize a voice of the user through a microphone, generate user information according to the recognition of the face or voice of the user, and transmit the user information to the content providing apparatus 200. Here, if a plurality of users are positioned within the vicinity of the display apparatus 100 or within a preset range from the display apparatus 100, the display apparatus 100 may recognize faces or voices of the plurality of users, generate user information for each of the plurality of users according to the recognition of the faces or voices of the plurality of users, and transmit the user information to the content providing apparatus 200.

If user information that is generated according to recognition of faces or voices of one or more users is received, the content providing apparatus 200 determines whether the terminal apparatus 300 of the user is registered, based on the received user information, in operation S320.

In detail, the content providing apparatus 200 may store registration information including certification information about a face or voice pattern of a registered user and terminal information about the terminal apparatus 300.

Therefore, the content providing apparatus 200 certifies the user according to whether face or voice pattern information included in the received user information of pre-stored registration information of a plurality of users and related registration information are stored. If the received user information and the related registration information are stored, the content providing apparatus 200 may determine whether the terminal information about the terminal apparatus 300 is stored in the corresponding registration information. Through a series of operations, as described above according to an exemplary embodiment, the content providing apparatus 200 may determine whether the terminal apparatus 300, related to the user that is certified by the display apparatus 100, is registered.

If it is determined in operation S320 that the terminal apparatus 300 is registered, the content providing apparatus 200 determines recommended content appropriate for the user based on pattern information about user usage of content and based on content information that is EPG information, in operation S330. The pattern information and the content information may be pre-stored. In operation S340, the content providing apparatus 200 determines whether it is possible to provide a content service for the determined recommended content. If it is determined, in operation S340, that it is possible to provide the content service for the recommended content, the content providing apparatus 200 transmits a notification message about the recommended content to the terminal apparatus 300, in operation S350.

Here, the pattern information may be at least one of a genre, usage time, and channel on which the content used by the user is provided. Also, the pattern information may be matched with registration information of a plurality of users pre-stored in the content providing apparatus 200 and then the pattern information may be stored. In detail, if a content is provided to the display apparatus 100 after the user is certified, the content providing apparatus 200 may analyze at least one of a genre, usage time, and a channel on which the corresponding content is provided to update and store the updated pattern information of the certified user. Therefore, the content providing apparatus 200 may match registration information of a plurality of users with the updated pattern information and then store the matched registration information and the updated pattern information.

Therefore, the content providing apparatus 200 determines recommended content appropriate for the user based on the pattern information matching the registration information of the certified user and content information that is EPG information and determines whether it is possible to provide the determined recommended content. If it is determined that it is possible to provide the recommended content, the content providing apparatus 200 may transmit a notification message about the recommended content to the terminal apparatus 300 of the user based on terminal information included in the registration information of the certified user.

According to an exemplary embodiment, if the recommended content is a broadcast program, the content providing apparatus 200 determines whether the display apparatus 100 and the terminal apparatus 300 exist in the same network. In detail, the display apparatus 100 and the terminal apparatus 300 may transmit their address information to the content providing apparatus 200. Therefore, the content providing apparatus 200 may determine whether the display apparatus 100 and the terminal apparatus 300 exist in the same network, based on the address information received from the display apparatus 100 and the terminal apparatus 300.

If it is determined that the terminal apparatus 300 and the display apparatus 100 exist in the same network, the content providing apparatus 200 transmits an execution-related notification message for the recommended content to the terminal apparatus 300.

The terminal apparatus 300 that receives the execution-related notification message for the recommended content from the content providing apparatus 200 transmits an execution command for the recommended content to the display apparatus 100 according to a user command. Therefore, the display apparatus 100 may select a channel providing the recommended content based on the received execution command to receive the recommended content from the channel and display the recommended content.

If it is determined that the terminal apparatus 300 and the display apparatus 100 do not exist in the same network, the content providing apparatus 200 transmits a recording-related notification message for the recommended content to the terminal apparatus 300.

The terminal apparatus 300 that receives the recording-related notification message for the recommended content from the content providing apparatus 200 transmits a recording command for the recommended content to the display apparatus 100 according to a user command. Therefore, the display apparatus 100 records the recommended content based on the received recording command.

After the content providing apparatus 200 transmits the recording-related notification message to the terminal apparatus 300, the content providing apparatus 200 may periodically receive address information from the terminal apparatus 300. Therefore, if it is determined that the terminal apparatus 300 and the display apparatus 100 exist in the same network, based on the address information received from the terminal apparatus 300, the content providing apparatus 200 may transmit an execution-related notification message for the recommended content to the terminal apparatus 300.

Therefore, the terminal apparatus 300 that receives the execution-related notification message for the recommended content transmits an execution command for the recommended content to the display apparatus 100 according to a user command. As a result, the display apparatus 100 may stop recording the recommended content, receive the recommended content from a channel providing the recommended content, and display the recommended content. However, the present general inventive concept is not limited thereto, and if the execution command for the recommended content is received, the display apparatus 100 that records the recommended content may simultaneously record and execute the recommended content.

According to yet another exemplary embodiment, if the recommended content is an application, the content providing apparatus 200 may transmit an installing or update-related notification message for the application to the terminal apparatus 300. The terminal apparatus 300 that receives the installing or update-related notification message for the application may transmit an execution command for the application to the display apparatus 100 according to a user command. Also, the display apparatus 100 may receive execution information for the application from the content providing apparatus 200 or an external server based on the received execution command to install the application in the display apparatus 100 or update an application preinstalled in the display apparatus 100.

If the terminal apparatus 300 is not registered in operation S320, the content providing apparatus 200 may register the terminal apparatus 300 through a series of operations that will be described with reference to FIG. 4.

Figure 4:
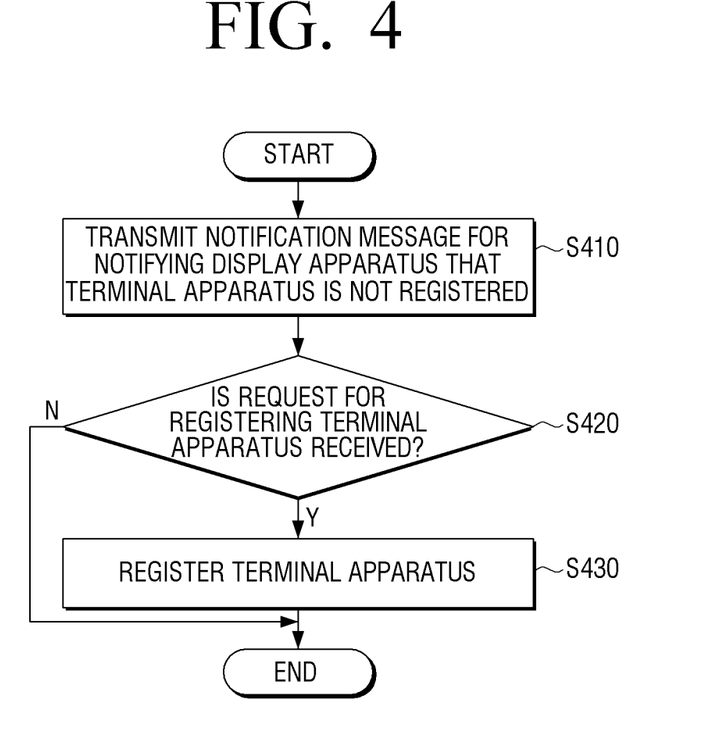
FIG. 4 is a flowchart illustrating a method of registering a sub terminal apparatus in a content providing apparatus, according to an exemplary embodiment.

FIG. 4 is a flowchart illustrating a method of registering a terminal apparatus in the content providing apparatus, according to an exemplary embodiment.

Referring to FIG. 4, if the terminal information about the terminal apparatus 300 is not stored in registration information of a user that is certified, the content providing apparatus 200 determines that the terminal apparatus 300 of the user is not registered. Therefore, in operation 5410, the content providing apparatus 200 transmits, to the display apparatus 100, a notification message for notifying the display apparatus 100 that the terminal apparatus 300 of the user is not registered. In operation 5420, the content providing apparatus 200 checks whether request information for registering the terminal apparatus 300 is received from the display apparatus 100. If it is determined in operation 5420 that the request information for registering the terminal apparatus 300 is received from the display apparatus 100, the content providing apparatus 200 registers the terminal apparatus 300 requested by the user, in operation 5430.

In detail, if a notification message for notifying the display apparatus 100 that the terminal apparatus 300 is not registered is received from the content providing apparatus 200, the display apparatus 100 generates on screen display (OSD) information for notifying the user that the terminal apparatus 300 that will provide a recommended content service is not registered based on the received notification message and displays the OSD information on a screen. If a command to register the terminal apparatus 300 that will be provided with a recommended content service is input from the user, the display apparatus 100 transmits registration request information including terminal information about the terminal apparatus 300 to the content providing apparatus 200.

Therefore, the content providing apparatus 200 registers the terminal apparatus 300 based on the registration information received from the display apparatus 100. If the request information for registering the terminal apparatus 300 is not received within a preset threshold time after the notification message for notifying the display apparatus 100 that the terminal apparatus 300 is not registered is transmitted to the display apparatus 100, the content providing apparatus 200 may transmit a notification message of the recommended content to the display apparatus 100. Therefore, the display apparatus 100 may generate OSD information for notifying the user that there is recommended content appropriate for the user, based on the notification message received from the content providing apparatus 200, and display the OSD information on the screen.

According to various exemplary embodiments, as described above, a content providing apparatus may provide a notification service for a recommended content to a terminal apparatus preferred by each user. Therefore, utilization of the notification service for the recommended content may be further improved.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art. The foregoing exemplary embodiments are merely illustrative and are not to be construed as liming. Many alternatives, modifications, and variations will be apparent to those skilled in the art. The scope is defined not by the detailed description of exemplary embodiments but by the appended claims, and their equivalents and all differences within the scope will be construed as being included in an inventive concept.

What is claimed is:

1. A method of recommending content of a content providing apparatus, the method comprising:
   receiving, by a communicator of the content providing apparatus, user information of a user from a display apparatus;
   determining, by a controller of the content providing apparatus, recommended content to be reproduced by the display apparatus;
   determining, by the controller of the content providing apparatus, whether a first network which the display apparatus uses and a second network which a terminal apparatus uses are the same based on address information of the display apparatus and the terminal apparatus;
   transmitting, by the communicator of the content providing apparatus, a first notification message about execution of the recommended content to the terminal apparatus if the first network and the second network are the same, and
   transmitting, by the communicator of the content providing apparatus, a second notification message about recording of the recommended content to the terminal apparatus if the first network and the second network are different.

2. The method of claim 1, further comprising:
   identifying, by a determiner of the content providing apparatus, the terminal apparatus of the user based on the received user information.

3. The method of claim 1, wherein the determining the recommended content comprises determining the recommended content based on pattern information about content usage of the user and contents information, and wherein the pattern information is at least one of a genre, usage time, and a channel which provides content that is used by the user.

4. The method of claim 3, further comprising updating, by the controller of the content providing apparatus, the pattern information about the content usage of the user based on content provided to the display apparatus.

5. The method of claim 1, wherein the recommended content is a broadcast program.

6. The method of claim 1, wherein, in response to determining that the first network and the second network being the same by the controller of the content providing apparatus after transmitting the second notification message, the first notification message for the recommended content is transmitted to the terminal apparatus.

7. The method of claim 1, further comprising transmitting, by the communicator of the content providing apparatus, to the terminal apparatus, an installing or update-related notification message, wherein the recommended content is an application.

8. The method of claim 1, wherein the user information is at least one of face recognition information and voice recognition information of the user.

9. The method of claim 1, wherein the determining the recommended content determine the recommended content based on pattern information about content usage of the user and contents information, and
wherein the pattern information and the content information are stored in a content providing apparatus which executes the receiving and the determining and wherein the terminal apparatus is a sub terminal with respect to the display apparatus which is a main apparatus for providing contents to the user.

10. The method of claim 9, wherein the content information comprises electronic guide information (EPG).

11. The method of claim 9, wherein the pattern information comprises information about contents, usage time, and channels preferred by the user.

12. A content providing apparatus comprising:
a communicator; and
a controller configured to:
in response to user information of a user being received from a display apparatus via the communicator, determine recommended content to be reproduced by the display apparatus,
determine whether a first network which the display apparatus uses and a second network which a terminal apparatus uses are the same based on address information of the display apparatus and the terminal apparatus,
control the communicator to transmit a first notification message about execution of the recommended content to the terminal apparatus if the first network and the second network are the same, and
control the communicator to transmit a second notification message about recording of the recommended content to the terminal apparatus if the first network and the second network are different.

13. The content providing apparatus of claim 12, further comprising:
a determiner configured to identify the terminal apparatus of the user based on the received user information.

14. The content providing apparatus of claim 12, wherein the controller determines the recommended content based on pattern information about content usage of the user and contents information, and
wherein the pattern information is at least one of a genre, a usage time, and a channel which provides content that is used by the user.

15. The content providing apparatus of claim 14, further comprising:
a storage,
wherein the controller further updates the pattern information about the content usage of the user based on content that is provided to the display apparatus and stores the updated pattern information in the storage.

16. The content providing apparatus of claim 12, wherein the recommended content is a broadcast program.

17. The content providing apparatus of claim 12, wherein, in response to determining that the first network and the second network being same after transmitting the second notification message, the controller further controls transmission to the terminal apparatus of the first notification message for the recommended content.

18. The content providing apparatus of claim 12, wherein the recommended content is an application and wherein the controller further controls transmission to the terminal apparatus of an installing or update-related notification message for the application.

19. A system for recommending content, the system comprising:
a display apparatus; and
a content providing apparatus configured to:
determine recommended content to be reproduced by the display apparatus,
determine whether a first network which the display apparatus uses and a second network which a terminal apparatus uses are the same based on a first address information of the display apparatus and the terminal apparatus,
transmit a first notification message about execution of the recommended content to the terminal apparatus if the network and the second network are the same, and
transmit a second notification message about recording of the recommended content to the terminal apparatus if the first network and the second network are different.

20. The system of claim 19, wherein the display apparatus recognizes a face or a voice of a user and transmits user information which comprises the face or the voice of the user to the content providing apparatus, and
wherein the content providing apparatus identifies the terminal apparatus of the user based in the user information.

21. The system of claim 19, wherein:
the recommended content is a broadcast program.

22. The system of claim 19, wherein, in response to determining that the first network and the second network are being the same after transmitting the second notification message, the content providing apparatus transmits, the terminal apparatus, the first notification message for the recommended content.

23. The system of claim 19, wherein the recommended content is an application, and wherein the content providing apparatus is further transmits, to the terminal apparatus, an installing or update-related notification message for the application.

* * * * *